United States Patent [19]

Botzman et al.

[11] Patent Number: 4,898,223

[45] Date of Patent: Feb. 6, 1990

[54] STIFF RUBBER COMPOSITION AND ARTICLES HAVING COMPONENTS THEREOF

[75] Inventors: Thomas J. Botzman, Stow; Samuel P. Landers, Uniontown, both of Ohio

[73] Assignee: The Goodyear Tire & Rubber Company, Akron, Ohio

[21] Appl. No.: 303,881

[22] Filed: Jan. 30, 1989

[51] Int. Cl.$^4$ .................. B60C 1/00; B60C 15/00; C08L 51/04
[52] U.S. Cl. ................................ 152/547; 525/83; 525/84
[58] Field of Search ............... 152/525, 547, 537; 525/192, 194, 80, 83, 84

[56] References Cited

U.S. PATENT DOCUMENTS

| | | | |
|---|---|---|---|
| 4,010,224 | 5/1977 | Scott et al. | 525/289 |
| 4,153,772 | 5/1979 | Schwesig et al. | 152/450 |
| 4,824,899 | 4/1989 | Yasuda | 152/547 |

Primary Examiner—Michael W. Ball
Assistant Examiner—Gregory J. Wilber
Attorney, Agent, or Firm—Henry C. Young, Jr.

[57] ABSTRACT

A rubber comprised of a sulfur cured blend of polyoctenamer rubber, alkyl methacrylate grafted cis 1,4-polyisoprene rubber and at least one additional sulfur curable rubber. The invention is further directed to a tire or industrial rubber product having at least one of its indicated components comprised of such sulfur cured rubber composition.

14 Claims, 1 Drawing Sheet

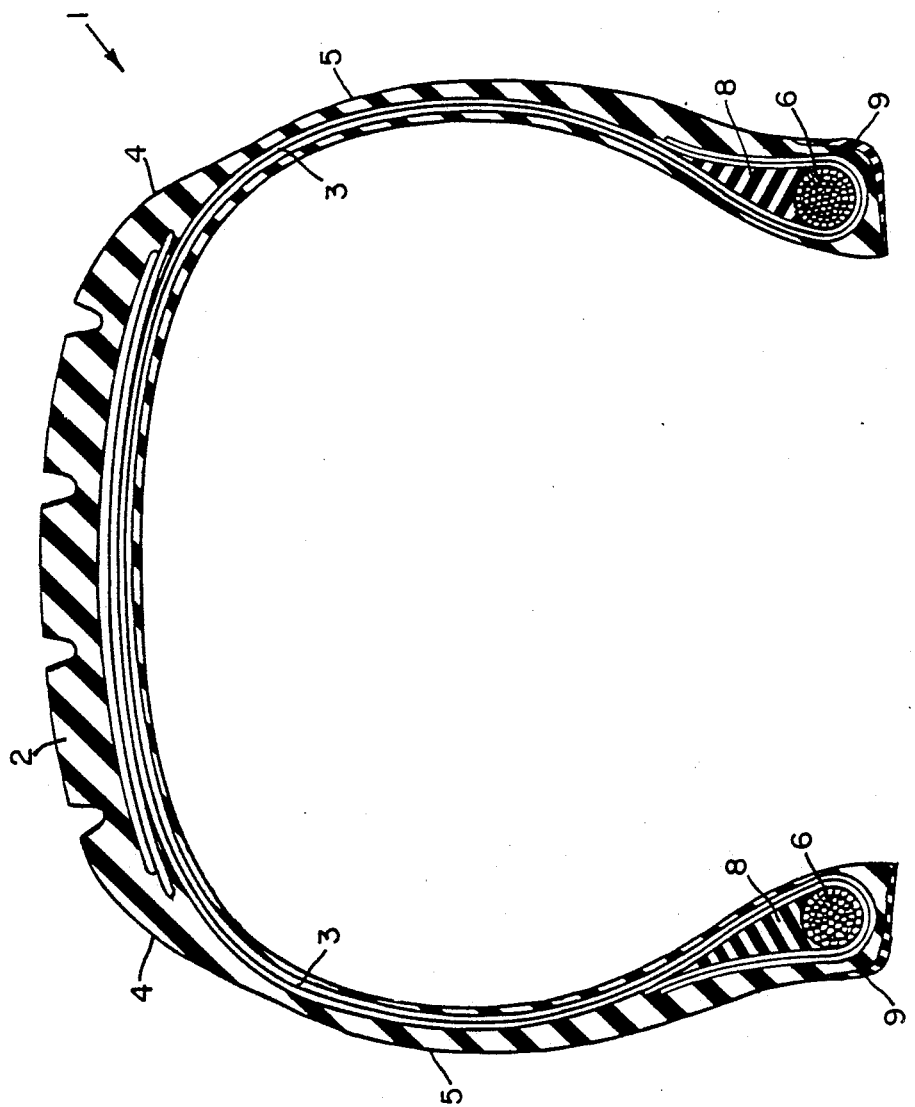

STIFF RUBBER COMPOSITION AND ARTICLES HAVING COMPONENTS THEREOF

FIELD

This invention relates to relatively stiff rubber compositions. The invention particularly relates to tires having components thereof and to industrial products such as belts, gears and hose which are constructed of or contain components of such stiff compositions.

BACKGROUND

Hard rubber is normally a rubber that has been compounded with various ingredients to increase its hardness. A measure of a harder rubber is typically demonstrated by a physical property such as a shore "A" ASTM hardness test. (ASTM No. D2240) Generally, a shore "A" hardness value in the range of about 80 to about 100 indicates that such a cured rubber would be classified as being a relatively hard rubber.

Generally the term "stiff rubber" can be exemplified by a physical property such as a three point bend test value (ASTM No. D-4475-85) and, generally, three point bend test values in the range of about 20 to about 30 denotes a stiff rubber (with a modified ASTM D-4475-85 as to sample shape and size, instrument crosshead speed and data points as hereinafter referenced in the example of this specification).

A hard rubber, although often more stiff than a rubber of less hardness, may not necessarily be, and more typically would not be, considered a relatively stiff rubber under such hardness parameters. Indeed, it would not usually be expected that a typical rubber of shore "A" hardness in the range of about 80 to 100 would have the prescribed three point bend test value of at least 20.

Stiff rubber compositions are often desirable for various purposes such as, for example, industrial rubber products of various types—also various components of an automobile tire, particularly those positioned in the bead and associated sidewall region.

Relatively hard rubber which may have a degree of stiffness can conventionally be prepared, for example, by compounding or mixing a relatively large amount of reinforcing materials with the rubber prior to its vulcanization such as, for example, carbon black, silica usually with a coupling agent, and short discontinuous fibers.

However, stiffer rubbers are sometimes desired which, in their unvulcanized state, can still be processed with conventional rubber processing equipment.

Conventionally, such stiffer rubber compositions are often prepared by adding various hardening resins and other such materials, as well as various reinforcing materials, to rubber mixtures as a part of their compounding recipe following which the composition is shaped and cured to form a stiff rubber material which can be a component of a manufactured article.

However, it is still desired to prepare additional suitable rubber compounds having a high degree of stiffness but which substantially maintain other desirable physical properties such as processability of the compounded rubber itself during its unvulcanized mixing stage and, its extrusion stage if utilized, and, also, the property of adhesion to other tire rubber components and to itself. For example, a stiff apex component of a tire should adhere to its associated sidewall and chafer components.

DISCLOSURE AND PRACTICE OF THE INVENTION

In accordance with this invention, a rubber composition is comprised of a sulfur cured blend of polyoctenamer rubber, alkyl methacrylate grafted cis 1,4-polyisoprene rubber and at least one additional sulfur curable rubber selected from natural rubber and synthetic rubbers containing carbon-to-carbon double bonds therein.

More specifically, in accordance with this invention, a sulfur cured rubber composition is provided having a three-point bend physical property in the range of about 20 to about 65, preferably about 30 to about 50, which is comprised of, based on 100 parts by weight rubber, a blend of (A) about 10 to about 60, preferably about 20 to about 40 parts by weight polyoctenamer rubber having a ML-4 viscosity value at 120° C. in the range of about 4 to about 6 in its unvulcanized state, (B) about 10 to about 60, preferably 20 to about 40 parts by weight alkyl methacrylate grafted cis 1,4-polyisoprene rubber having a mole ratio of methacrylate to rubber in the range of about 0.25/1 to about 1.5/1, preferably about 0.4/1 to about 1/1, and (C) about 30 to about 80 parts by weight of at least one additional sulfur curable rubber selected from natural rubber and synthetic rubber containing carbon-to-carbon double bonds therein.

The said three-point bend property can be determined by the aforesaid ASTM Test No. D4475-85 modified as to sample configuration instrument speed and data point observation as hereinafter pointed out.

In a preferred embodiment of this invention, a tire, preferably a pneumatic rubber tire, comprised of components as its tread, sidewalls, spaced beads encased in a rubber matrix, chafer, fabric reinforced carcass, circumferential fabric reinforced belt(s) and an apex characterized in that at least one of said bead, chafer and apex components is comprised of the sulfur cured rubber composition of this invention.

All of such tire components are well known to those having skill in such art. Typically, a tire contains other components too numerous to reasonably describe. While, by the "comprising" language it is intended that such other components are not excluded from the tire construction, it is intended to specifically identify and reference the apex, bead and chafer components as being comprised of the rubber composition of this invention for the benefits it bestows.

For an additional preferred embodiment of this invention and industrial rubber product, as a manufactured article, selected from at least one of power transmission belt, conveyor belt and hose is comprised, at least in part, of the sulfur cured composition of this invention. Such industrial products are well known to those having skill in such art, particularly where it is recognized that the relatively stiff cured rubber composition of this invention can impart on enhanced stiffness to the manufactured article as a desirable property of the industrial product.

A polyoctenamer rubber (or trans-polyoctenylene rubber as it may sometimes be referenced) is described as a metathesis polymer of cyclooctene with prevalently trans-isomeric carbon to carbon double bonds. Generally, a particular feature of the unvulcanized polyoctenamer is that its Mooney viscosity (ML-4) is typically about 4 to 6 at 120° C. and thus, acts much like a rubber processing oil under rubber processing conditions. For comparison, normally a rubber's ML-4 viscosity may drop to about 40 at 120° C. The polyoctenamer is termed as a rubber herein because it is a polymer containing sulfur vulcanizable carbon to carbon double bonds and is elastomeric following vulcanization thereof.

The alkyl methacrylate-natural rubber graft polymer can be described as a graft polymer comprised of the methacrylate, preferably methyl methacrylate, grafted to natural rubber, or cis 1,4 polyisoprene rubber, in a mole ratio in the range of about 0.25/1 to about 1.5/1, preferably about 0.4/1 to about 1/1, (methacrylate to rubber).

The graft polymer can typically be suitably prepared by free radical polymerizing alkyl methacrylate monomer in a cis 1,4-polyisoprene emulsion, preferably natural rubber aqueous latex, in the presence of a peroxide initiator and recovering the graft polymer therefrom. Such graft polymer might also be prepared by a solid state type reaction, although currently the emulsion, or latex, reaction is preferred.

In the practice of this invention, various alkyl methacrylates can be used to graft to the natural (or cis 1,4-polyisoprene) rubber, representative of which are, for example, ethyl methacrylate and methyl methacrylate. Preferably, methyl methacrylate is used.

The cis 1,4-polyisoprene rubber can be a synthetic rubber, although natural rubber is preferred so that the methacrylate grafting can take place in its natural latex.

Various of said other and additional synthetic rubbers can be used representative of which are those that contain carbon to carbon unsaturation therein in order to enable them to be sulfur cured such as, for example, cis 1,4-polyisoprene, polybutadiene, styrene/butadiene copolymers, styrene/isoprene butadiene terpolymers, butadiene/acrylonitrile copolymers, and isoprene/acrylonitrile copolymers. Generally, synthetic rubbers such as cis 4,4-polyisoprene, polybutadiene and styrene/butadiene copolymers are preferred.

While such other rubbers are described as being sulfurable curable for characterization purpose, it is to be understood that small amounts of additional curatives such as, for example, well known peroxides, can be used together with sulfur curatives to cure the rubbers.

The polybutadiene rubbers can be those with typical low vinyl contents or can be those with medium to high vinyl contents such as about 30 to approximately 90 or from about 40 to about 70. Such rubbers are well known to those having skill in such art.

The styrene/butadiene copolymer rubber (SBR) can be of the solution or emulsion polymerization prepared type with various amounts of vinyl content and styrene content. Such rubbers are well known to those having skill in the art.

It is to be understood by one having skill in the art that various other additives can be and usually are utilized with the rubber composition such as, for example, those selected from carbon black, silica, processing oils, sulfur cure accelerators and retarders, if desired, antidegradants, zinc oxide, zinc stearate, stearic acid, and other pigments, if desired, as well as sulfur curative.

The materials may be mixed by conventional means which are well known to those having skill in the art. For example, the rubber, polyoctenamer and alkylmethacrylate graft polymer can be mixed in a mixing apparatus along with other additives such as the carbon black, silica, zinc oxide, sulfur cure accelerators, zinc stearate (or stearic acid), processing oil and sulfur and the mixture sheeted out on a mill and then fabricated into a suitable manufactured product. Alternatively, the materials can be mixed in various two-step processes in which, as for example, a second step, the sulfur and accelerators are added after most, if not all, of the other materials are mixed. Such processing and variations thereof are also well known to those having skill in such art, as well as other mixing steps and procedures.

In the practice of this invention, although the entire contribution may not be fully understood, it is visualized that the graft polymer formed with the alkyl methacrylate and cis 1,4-polyisoprene (natural) rubber substantially enhances the stiffness of the ultimately cured rubber composition.

However, the mixture of such graft polymer and rubber has been typically found to be too stiff even in its unvulcanized state to be easily or reasonably processed in conventional rubber processing equipment and/or apparatus.

It has been discovered that the polyoctenamer can be successfully blended with the combination of graft polymer and other rubber to create a stiff rubber, when cured, but which can be processed in its unvulcanized state with conventional rubber processing equipment. Indeed, it is considered that an important function of the polyoctenamer is to enable the preparation of a relatively lower viscosity (Mooney) rubber compound mixture, thus having a high degree of processability yet which will cure to form a very stiff rubber in spite of the relatively low Mooney viscosity in its unvulcanized state. This important discovery has been observed to enable the preparation of components of manufactured articles such as tires and industrial products utilizing the aforesaid graft polymer which was heretofore observed to be reasonably possible, if at all, only with some difficulty because of processing problems.

The utility of the stiff, cured composition of this invention is particularly applicable to the preparation or manufacture of tires (utilizing the composition in its unvulcanized state for the construction of the tire after which it is subsequently vulcanized as a component of the tire structure itself) as well as industrial products such as power transmission belts, hose, conveyor belts, and damping pads where stiffness is a desirable feature of the manufactured article. When such material is used in the fabrication of a tire, it is generally considered that a composition of such property can be advantageously used for the apex (to enhance the tire's cornering characteristic), chafer (to aid an abrasion resistance property of the tire against the rim) and bead (to enhance the tire's cornering characteristic, particularly when used in conjunction with a stiff apex). The apex is generally described as a tire component having a generally triangular cross-section with its base positioned adjacent to or in the region of the bead portion and with its apex extending radially outward into the shoulder region of the tire.

Where cornering effect is a consideration, at least the apex, or aforesaid triangular component, and also, usually the bead of the tire construction are preferred components for the composition of this invention to aid in resisting resultant lateral forces.

Use of the composition in the bead component of the tire enables a stiffer bead bundle (rubber compound plus bead wires) to aid in resisting lateral forces during vehicular cornering.

For further understanding of this invention, reference is made to the accompanying drawing in which is depicted a cross-sectional view of a belted radial ply tire 1.

In the drawing, components of the tire 1 are shown as being its tread 2, sidewall(s) 5, shoulder region(s) 4 abridging the tread 2 and sidewall(s) 5, spaced "bundled" wire beads 6 and supporting fabric reinforced carcass therefor 3.

The apex component 8 is as a primarily triangular component with its base positioned in the bead 6 region and extends, basically, radially outward therefrom between the radial ply and its turn-up portion with its apex extending into the sidewall area of the tire. The stiff apex component 8 of this invention adds dimensional stability to the tire when experiencing the forces imparted to it during a vehicle cornering maneuver.

The chafer component 9 of the tire is positioned in its bead region 6, basically between the bead 6 and the rigid tire rim on which the tire is to be mounted. The stiff chafer component 9 of this invention adds dimensional stability to the tire by resisting forces transferred from the rim during cornering.

The bead 6 portion of the tire encapsulated with the rubber compound of this invention adds dimensional stability to the tire by resisting deformation of the bead bundle under stress.

The practice of this invention is further illustrated by a reference to the following example which is intended to be representative rather than restrictive of the scope of the invention. Unless otherwise indicated, all parts and percentages are by weight.

EXAMPLE I

A rubber composition for a tire apex is prepared by mixing the appropriate ingredients in a suitable and conventional rubber mixing apparatus which is comprised of the recipes shown in the following Table 1 for rubber compounds identified herein as Experiment X and Experiment Y. The indicated rubbers contained a small amount of antidegraant (s) for preservation purposes.

TABLE 1

| Material | Experiment X | Experiment Y |
|---|---|---|
| Polyoctenamer[1] | 30 | 0 |
| Methylmethacrylate/NR[2] | 30 | 0 |
| Natural rubber[3] | 30 | 90 |
| Synthetic rubber[4] | 10 | 10 |
| Carbon black | 75 | 75 |
| Oil, processing | 4 | 4 |
| Zinc Oxide | 5 | 5 |
| Stearic acid | 1 | 1 |
| Accelerator(s) | 1.5 | 1.5 |
| Sulfur | 3 | 3 |
| Other (Tackifiers, Peptizers, Resins) | 8 | 8 |

[1] a polymer of cyclooctene with prevalently trans-isometric carbon-to-carbon double bonds and as described in this specification.
[2] methylmethacrylate/natural rubber graft polymer with a ratio of acrylate to natural rubber of about 0.5/1 as described in this specification.
[3] natural cis 1,4-polyisoprene rubber.
[4] emulsion polymerization prepared styrene/butadiene copolymer rubber having a styrene content of about 23.5% and a vinyl content of about less than five percent.

The resulting mixtures were milled to form sheets thereof from which samples were taken and cured at a temperature of about 150° C. for about 18 minutes. Portions of the samples were evaluated for their physical properties which is shown in the following Table 2. The rubber mixtures for Experiment X and Experiment Y were suitably processed in conventional rubber processing and mixing equipment and apparatus.

TABLE 2

| Property | Experiment X | Experiment Y |
|---|---|---|
| 300% Modulus | — | 16.0 |
| Tensile | 11.8 | 18.6 |
| Elongation | 160 | 360 |
| Dynamic Stiffness E' | 30.7 | 21.5 |
| Adhesion to itself | 20 | 25 |
| Three-Point Bend Test (stiffness) | 33 | 21 |

Thus, the compositions of Experiment X and Experiment Y demonstrated a relatively high stiff physical property because their three point bend physical property had values of 33 and 21, respectively.

EXAMPLE II

Rubber compositions were prepared according to EXAMPLE I and utilized in the fabrication of a tire as an apex in its construction. The tire was identified as a P225/50VR16 tire which meant that it was a steel beltdd radial tire with polyester cord reinforced carcass. The composition of this invention, particularly because of its relatively stiff property, exhibits a special benefit for the tire because it provides an increased radial and cornering stiffness and resistance to lateral forces.

What is claimed is:

1. A rubber comprised of a sulfur cured blend of polyoctenamer rubber, alkyl methacrylate grafted cis 1,4-polyisoprene rubber and at least one additional sulfur curable rubber selected from natural rubber and synthetic rubber containing carbon-to-carbon double bond therein.

2. The rubber of claim 1 where said polyoctenamer is a metathesis polymer of cyclooctene and is characterized by having a Mooney viscosity (ML-4) of about 4 to 6 at 120° C., where the said graft polymer is a graft of methylmethacrylate to natural rubber in a mole ratio in the range of about 0.25/1 to about 1.5/1.

3. The rubber of claim 2 in which the said rubber composition is characterized by having a three-point blend physical property value in the range of about 20 to about 65 and is comprised of, based on 100 parts by weight of the rubber therein, (A) about 10 to about 60 parts by weight polyoctenamer rubber: (B) about 10 to about 60 parts by weight said graft rubber and: (C) about 30 to about 80 parts by weight said other sulfur vulcanizable rubber.

4. The rubber of claim 2 in which said other sulfur vulcanizable rubber is selected from at least one of cis 1,4-polyisoprene, polybutadiene, styrene/butadiene copolymers, styrene/isoprene/butadiene terpolymers, butadiene/acrylonitrile copolymers, and isoprene/acrylonitrile copolymers.

5. A tire comprised of components as its tread, sidewalls, spaced beads encased in a rubber matrix, chafer, fabric reinforced carcass, circumferential fabric reinforced belt(s) and an apex characterized in that at least one of said bead, chafer and apex components is comprised of the sulfur cured rubber composition of claim 1.

6. The tire of claim 5 as a pneumatic tire where its apex component is comprised of the sulfur cured rubber composition of claim 2.

7. The tire of claim 5 as a pneumatic tire where the rubber matrix of its bead components is comprised of the sulfur cured rubber composition of claim 2.

8. The tire of claim 5 as a pneumatic tire where its chafer component is comprised of the sulfur cured rubber composition of claim 2.

9. The tire of claim 5 as a pneumatic tire where, in said sulfur cured rubber composition, the polyoctenamer is a metathesis polymer of cyclooctene and is characterized by having a Mooney viscosity (ML-4) of about 4 to 6 at 120° C.; where the said graft polymer is a graft of methylmethacrylate to natural rubber in a mole ratio in the range of about 0.25/1 to about 1.5/1; where the said rubber composition is characterized by having a three-point blend physical property value in the range of about 20 to about 65 and is comprised of, based on 100 parts by weight of the rubber therein, (A) about 10 to about 60 parts by weight polyoctenamer rubber: (B) about 10 to about 60 parts by weight said graft rubber and; (C) about 30 to about 80 parts by weight said other sulfur vulcanizable rubber.

10. The tire of claim 9 in which said other sulfur vulcanizable rubber is selected from at least one of cis 1,4-polyisoprene, polybutadiene, styrene/butadiene copolymers, styrene/isoprene/butadiene terpolymers, butadiene/acrylonitrile copolymers, and isoprene/acrylonitrile copolymers.

11. The tire of claim 9 where at least one of its apex, chafer and rubber matrix of its bead component(s) is comprised of the said sulfur cured rubber composition.

12. The tire of claim 9 where its apex component is comprised of the said sulfur cured rubber composition.

13. An industrial rubber product selected from at least one of belts and hoses comprised, at least in part, of the sulfur cured rubber composition of claim 1.

14. The industrial rubber product of claim 13 wherein said sulfur cured rubber composition, the polyoctenamer is a metathesis polymer of cyclooctene and is characterized by having a Mooney viscosity (ML-4) of about 4 to 6 at 120° C.; where the said graft polymer is a graft of methylmethacrylate tonatural rubber in a mole ratio in the range of about 0.25/1 to about 1.5/1; where the said rubber composition is characterized by having a three-point blend physical property value in the range of about 20 to about 65 and is comprised of, based on 100 parts by weight of the rubber therein, (A) about 10 to about 60 parts by weight polyoctenamer rubber; (B) about 10 to about 60 parts by weight said graft rubber and; (C) about 30 to about 80 parts by weight said other sulfur vulcanizable rubber.

* * * * *